(12) United States Patent
Wilhelm et al.

(10) Patent No.: US 7,787,696 B2
(45) Date of Patent: Aug. 31, 2010

(54) SYSTEMS AND METHODS FOR ADAPTIVE SAMPLING AND ESTIMATING A SYSTEMATIC RELATIONSHIP BETWEEN A PLURALITY OF POINTS

(75) Inventors: Robert G. Wilhelm, Charlotte, NC (US); Robert M. Edgeworth, Chandler, AZ (US)

(73) Assignee: University of North Carolina at Charlotte, Charlotte, NC (US)

( * ) Notice: Subject to any disclaimer, the term of this patent is extended or adjusted under 35 U.S.C. 154(b) by 2519 days.

(21) Appl. No.: 09/876,915

(22) Filed: Jun. 8, 2001

(65) Prior Publication Data
US 2002/0025074 A1    Feb. 28, 2002

Related U.S. Application Data

(60) Provisional application No. 60/228,347, filed on Aug. 28, 2000.

(51) Int. Cl.
G06K 9/46      (2006.01)
(52) U.S. Cl. ............... 382/203; 345/421; 345/441; 345/606; 382/154; 382/199
(58) Field of Classification Search .......... 382/154, 382/190, 197, 199, 201–203, 242, 298–300; 345/420, 423, 441–443, 606
See application file for complete search history.

(56) References Cited

U.S. PATENT DOCUMENTS

| | | | | |
|---|---|---|---|---|
| 5,222,202 A | * | 6/1993 | Koyamada | 345/423 |
| 5,649,081 A | * | 7/1997 | Nakajima et al. | 345/588 |
| 5,737,449 A | * | 4/1998 | Lee | 382/242 |
| 5,754,680 A | * | 5/1998 | Sato et al. | 382/154 |
| 5,802,202 A | * | 9/1998 | Yamada et al. | 382/154 |
| 5,861,874 A | * | 1/1999 | Joto | 345/173 |
| 5,933,149 A | * | 8/1999 | Mori et al. | 345/442 |
| 5,936,628 A | * | 8/1999 | Kitamura et al. | 345/420 |
| 6,023,300 A | * | 2/2000 | Han et al. | 375/240.16 |
| 6,163,731 A | * | 12/2000 | Shiroyama et al. | 700/102 |
| 6,373,491 B1 | * | 4/2002 | Sasaki | 345/443 |
| 6,556,198 B1 | * | 4/2003 | Nishikawa | 345/420 |
| 6,664,960 B2 | * | 12/2003 | Goel et al. | 345/423 |
| 7,589,844 B2 | * | 9/2009 | Hirata et al. | 356/601 |

OTHER PUBLICATIONS

Edgeworth, R. et al., "Adaptive sampling for coordinate metrology," Precision Engineering, vol. 23, pp. 144-154, 1999.

(Continued)

Primary Examiner—Gregory M Desire
(74) Attorney, Agent, or Firm—Kilpatrick Stockton LLP (57) ABSTRACT

Systems and methods for estimating a systematic relationship between a plurality of points include determining an estimated systematic relationship representative of the plurality of points according to an estimation function and based on a given set of measured points. The estimated systematic relationship having coordinate data and normal vector data associated with the given set of points and corresponding to at least a portion of the plurality of points. Further, an adaptive sampling mechanism may automatically determine whether further measurements are required based on the estimated systematic relationship and based on predetermined measurement criteria. Additionally, a data verification device may remove inaccurate data from the estimation process.

31 Claims, 3 Drawing Sheets

OTHER PUBLICATIONS

Edgeworth, R. et al., "Measurement uncertainty due to work-piece error interaction with sampling period," Center of Precision Metrology, Department of Mechanical Engineering and Engineering Science, The University of North Carolina at Charlotte, 1999.

Elkott, D. et al., "Isoparametric line sampling for the inspection planning of sculptured surfaces," Computer-Aided Design, vol. 37, pp. 189-200, 2005.

Elkott, D. et al., "CAD-based sampling for CMM inspection of models with sculptured features," Engineering with Computers, vol. 23, pp. 187-206, 2007.

Elkott, D. et al., "Automatic sampling for CMM inspection planning of free-form surfaces," International Journal of Production Research, vol. 40, No. 11, pp. 2653-2676, 2002.

Huang, J., "An efficient approach for solving the straightness and the flatness problems at large number of data points," Computer-Aided Design, vol. 35, pp. 15-25, 2003.

Pedone, P. et al., "Kriging-based sequential inspection plans for coordinate measuring machines," Applied Stochastic Models in Business and Industry, vol. 25, pp. 133-149, 2009.

Savio, E. et al., "Metrology of freeform shaped parts," Annuals of the CIRP, vol. 56, No. 2, pp. 810-835, 2007.

Summerhays, K. et al., "Optimizing discrete point sample patterns and measurement data analysis on internal cylindrical surfaces with systematic form deviations," Precision Engineering Journal of the International Societies for Precision Engineering and Nanotechnology, vol. 26, pp. 105-121, 2002.

Wilhelm, R. et al., "Task specific uncertainty in coordinate measurement," Center for Precision Metrology, Department of Mechanical Engineering and Engineering Science, University of North Carolina at Charlotte, USA, (2001).

* cited by examiner

SYSTEMS AND METHODS FOR ADAPTIVE SAMPLING AND ESTIMATING A SYSTEMATIC RELATIONSHIP BETWEEN A PLURALITY OF POINTS

CROSS REFERENCE TO RELATED APPLICATIONS

This application claims the benefit of U.S. Provisional Application No. 60/228,347, filed Aug. 28, 2000.

BACKGROUND OF THE INVENTION

This invention relates generally to systems and methods for estimating a systematic relationship between a plurality of points, and, more particularly, to systems and methods for adaptively sampling points and estimating a form based on coordinate data and normal vector data.

The estimation of the shape of a form, such as a surface or wave, generally involves the measurement of point data associated with a plurality points on the form. For example, the point data includes a geometrical description of the location of the point on the form. The number and location of the plurality of points are generally determined by a sampling plan, which identifies the location of various sampling points whose measurements may be used to estimate the shape of the entire form. Traditionally, in order to increase the accuracy of the estimation, the number of points measured in the sampling plan are increased. Increasing the number of measured points, however, leads to a number of drawbacks. For example, each point added to the sampling plan adds cost to the estimation process by increasing the time required to measure the point and include the measurement results in the estimation. Thus, traditional sampling plans and form estimators disadvantageously require an increasing amount of time to achieve an increasing level of accuracy.

Further, for example, the points identified by the sampling plan will dramatically affect the accuracy of the estimation. Many sampling plans include a grid-like array of points having a given spaced-apart relationship. For example, such a grid-like array may be obtained in a "line scan". In order to obtain an accurate estimation of the form, however, a sampling plan may need to include denser grids in some portions of the form, such as in portions of the form having complex shapes. Also, for example, a grid-like sampling plan having predetermined spacing may waste time making measurement in portions of the form that are uncomplicated and thus may be estimated with only a few samples. Additionally, having a sample plan that samples a lot of points in a non-complex portion of the form may increase the variability of the estimate. As such, the development of an accurate sampling plan for a given form may require a high investment in time and cost. Also, the time and cost is further multiplied for every form for which an estimate is required. Thus, the accuracy and completeness of the form estimation, as well as the time required to perform the measurements, is highly dependent on the sampling plan.

In addition, typical systems and methods for estimating a form may produce inaccurate results by including erroneous data in the estimation. For example, when measuring a form, a disturbance in the measuring system or foreign matter on the form may result in a measurement that is grossly inaccurate. Such a measurement may be referred to as an "outlier". If such an outlier is used in estimating the form, then the estimate will not correctly represent the portion of the form adjacent to the outlier. Complex statistical models may be developed to detect and throw out such outliers, but less complex and more efficient solutions are desired.

Further, traditional systems for estimating the shape of a form typically only use the position data associated with a measured point, thereby requiring additional input to obtain accurate results. Some systems, such as line scanning systems, use surface normal data associated with a measured point to aid in guiding the probe movements to avoid interference with portions of the surface, however, this additional surface normal data is not used to estimate the shape of the form or to reduce the required number of measured points.

Therefore, systems and methods are desired to increase the efficiency, accuracy and completeness of form estimators and their associated sampling plans.

BRIEF SUMMARY OF THE INVENTION

The systems and methods of the present invention address the drawbacks of the prior art by using the increased information content available when both the normal vector data and position or coordinate data associated with a measured point are utilized to estimate a form or systematic relationship between a plurality of points Using the information associated with the normal vector and position of the measured points, an indication of how the shape of the form is changing locally is obtained. This information is utilized by an estimation function that predicts the shape of the form or the systematic relationship between the plurality of points Further, predetermined measurement criteria are utilized to decide if subsequent measurement at predetermined points are required to complete the estimation within desired limits and, if so, the optimal location for the predetermined points.

In one embodiment, a method for estimating a systematic relationship between a plurality of points, comprises: obtaining coordinate data and normal vector data associated with each point of a starting set of points, where the starting set comprises at least three non-linear points; and determining a first estimated systematic relationship between a plurality of points based on the coordinate data and the normal vector data associated with the starting set of points.

In another embodiment, a method for estimating a relationship between a plurality of points, comprises: generating a first estimated relationship between the plurality of points based on measured coordinate data and normal vector data, the measured coordinate data comprising a measured value of a vector associated with a point corresponding to a given one of the plurality of points, the normal vector data representative of a local rate of change with respect to the vector associated with the given one of the plurality of points, the first estimated relationship between the plurality of points derived from estimated normal vector data corresponding to at least a portion of the plurality of points; and automatically determining whether further measurements are required based on the estimated normal vector data in combination with predetermined measurement criteria.

In yet another embodiment, a method of estimating a relationship between a plurality of points, comprises: removing data from a plurality of coordinate data and normal vector data associated with measured points defining a starting set associated with the plurality of points based on estimated normal vector data associated with the measured points, thereby defining a revised starting set; and generating a first estimated relationship between the plurality of points based on the coordinate data and the normal vector data of the revised starting set, the coordinate data comprising a measured value of a vector associated with a point corresponding to a given one of the plurality of points, the normal vector data comprising a the local rate of change associated with the vector of the given one of the plurality of points, the first estimated relationship between the plurality of points derived from estimated normal vector data corresponding to at least a portion of the plurality of points.

In another embodiment, a method for estimating a systematic relationship between a plurality of points, comprises: receiving measurement data relating to a point associated with the plurality of points; and generating a first estimated systematic relationship between the plurality of points according to a predetermined function representing a multi-dimensional relationship and based on the measurement data, the first estimated systematic relationship having coordinate data and normal vector data.

In a further embodiment, a computer readable medium for estimating a systematic relationship between a plurality of points, comprises: an estimation module having a predetermined estimation function operative to generate a first estimated systematic relationship between the plurality of points based on coordinate data and normal vector data, the coordinate data comprising a measured value of a vector corresponding to a given one of the plurality of points, the first estimated systematic relationship between the plurality of points derived from estimated normal vector data corresponding to at least a portion of the plurality of points; and an adaptive sampling module operative to automatically determine whether further measurements are required based on the estimated normal vector data in combination with predetermined measurement criteria.

In another embodiment, a system for estimating a systematic relationship between a plurality of points, comprises: an estimator having an estimation function operable for determining a first estimated systematic relationship between the plurality of points, the first estimated systematic relationship between the plurality of points having coordinate data and normal vector data determined from a starting set of measured points associated with the plurality of points; wherein the coordinate data comprise a value of a vector associated with the plurality of points; and wherein the normal vector data comprise a value of a local rate of change of the vector associated with the plurality of points.

In a further embodiment, a system for estimating a systematic relationship between a plurality of points, comprises: an estimator comprising a first program operable for receiving coordinate data and normal vector data associated with each of a starting set associated with the plurality of points, wherein the starting set comprises at least three non-linear points, the estimator further comprising a first estimated systematic relationship between the plurality of points and a predetermined estimation function, the first estimated systematic relationship between the plurality of points comprising estimated coordinate data and estimated normal vector data representative of an estimate of the systematic relationship between the plurality of points and generated by the predetermined estimation function based on the coordinate data and the normal vector data; and an adaptive sampling mechanism operative on a systematic relationship error representative of a difference between the first estimated systematic relationship and a reference systematic relationship, wherein the reference systematic relationship comprises reference coordinate data and reference normal vector data each having desired values associated with the plurality of points, wherein the systematic relationship error comprises a plurality of points corresponding to the reference systematic relationship and having coordinate data error and normal vector data error, the adaptive sampling mechanism further operative to generate a target point and further comprising a predetermined error limit, the target point corresponding to a point having a maximum estimated error within the systematic relationship error and the predetermined error limit comprising a value determinative of an acceptability of the systematic relationship error.

And, in yet another embodiment, a system for estimating a systematic relationship between a plurality of points, comprises: an estimator having an estimation function having a predetermined dimensionality and operable for determining a first estimated systematic relationship between the plurality of points, the first estimated systematic relationship between the plurality of points having coordinate data and normal vector data determined from a starting set of measured points associated with the plurality of points; wherein the coordinate data comprise a value of a vector associated with the plurality of points; and wherein the normal vector data comprise a value of a local rate of change of the vector associated with the plurality of points.

DETAILED DESCRIPTION OF THE INVENTION

In one aspect, systems and methods of the present invention deal with adaptively sampling points of a form to develop an estimate of the form according to an estimation function. The adaptive sampling and form estimation is based on normal vectors associated with the measured points and on predetermined error limits. The form may include, for example, a three-dimensional surface or a waveform.

In another aspect, systems and methods of the present invention deal with validating the measured data associated with a point, and considering or discarding the measured data based on normal vectors associated with adjacent measured points and on predetermined error limits.

Further, the systems and methods of the embodiments of the present invention may be utilized in any system that measures or estimates a systematic relationship between a plurality of points. Such systems include coordinate metrology systems, signal processing systems, reverse engineering systems, computer aided engineering systems, control systems, systems that manage color-such as estimating gradients or removing aliasing, navigation systems, computer vision systems, medical sensing and imaging systems, etc.

Figure 1:
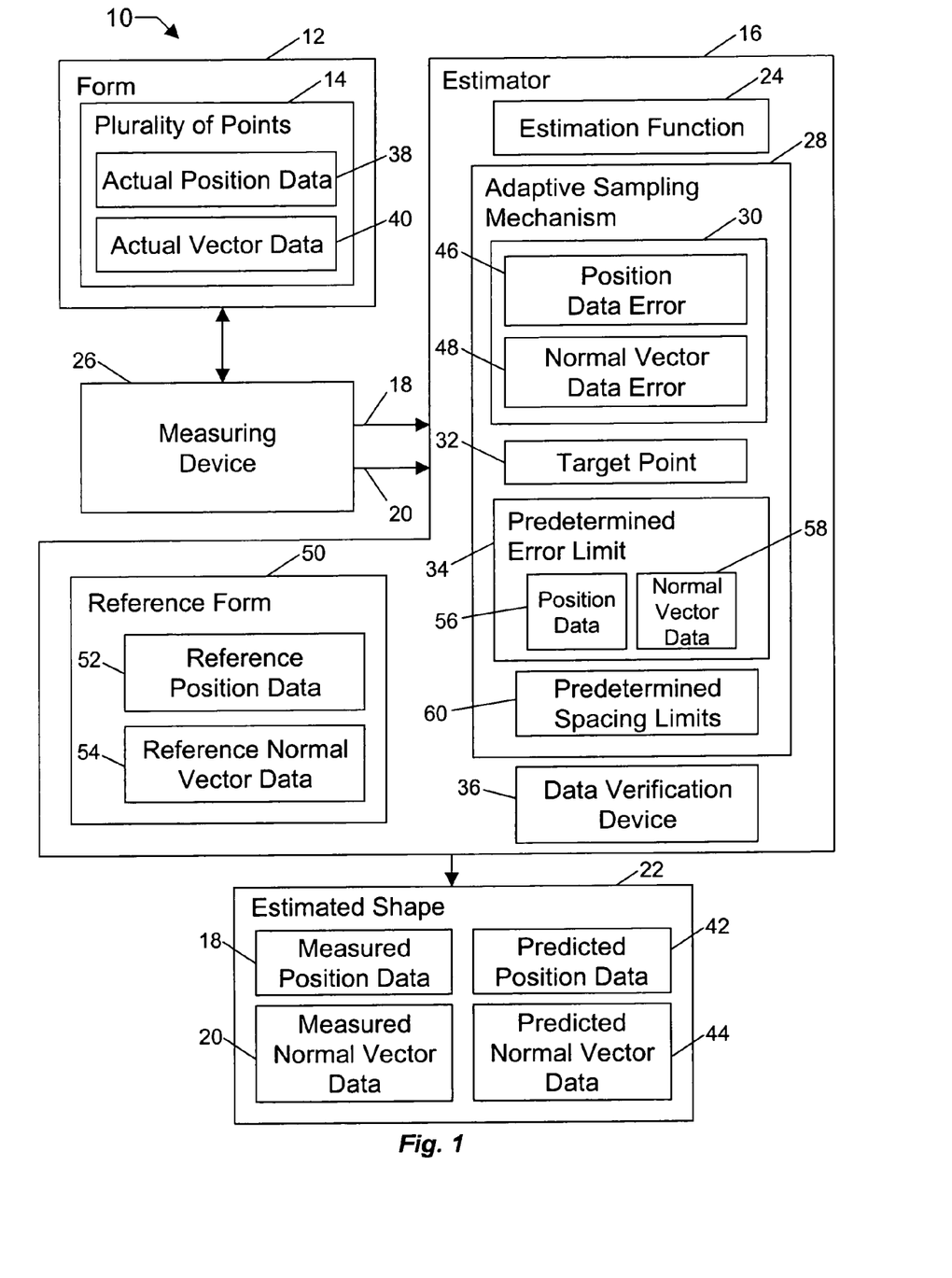
FIG. 1 is a schematic diagram representing one embodiment of a form estimation system of the present invention.

Referring to FIG. 1, in one embodiment, a form estimation system 10 for estimating a. shape of a form 12 defined by a plurality of points 14 includes an estimator 16 that receives measured or computed position data 18 and measured or computed normal vector data 20 associated with given points on the form and generates an estimated shape 22 based thereon and according to an estimation function 24. Estimation function 24 processes position data 18 and normal vector data 20, or data error 30 associated therewith, according to a predetermined mathematical model to predict a shape of form 12 based on values associated with the measured or computed points. A measurement device 26 may supply position data 18 and normal vector data 20 to estimator 16. Additionally, estimator 16 may include an adaptive sampling mechanism 28 that determines error 30 associated with the data, determines whether further measurements are required depending on the magnitude of the error, and identifies at least one target point 32 on form 12 for further measurement. Adaptive sampling mechanism 28 is driven by, among other factors, the normal vector data 20, error 30 and a predetermined error limit 34 to automatically make the sampling decision. Further, estimator 16 may include a data verification device 36 for analyzing the measured/computed data or error data with respect to estimated data in order to verify the accuracy of the measured/computed data or error data and remove inaccurate data. Thus, form estimation system 10 utilizes position data and normal vector data to automatically sample points on form 12 according to adaptive sampling mechanism 28 and to predict the shape of the form 12 according to estimator 16 such that the estimated shape 22 is accurate within predetermined error limit 34.

Form 12 includes a surface, a waveform, any object, or any physical or artificially-generated phenomenon having a measurable shape or having a systematic relationship between points. Plurality of points 14 includes points that define the surface of form 12. Each of the plurality of points 14 includes associated data that describe the point, including actual position data 38 and actual normal vector data 40. As used herein, the term "position data" includes any coordinate data that can be represented in vector space, such as, in one example, the position of the point in an x-, y- and z-axis coordinate system. The term "normal vector data" includes data representing the magnitude and direction of a vector positioned normal to a line or plane tangentially positioned with respect to a given point on the form, or data that describes or estimates the instantaneous rate of change of the position data. For example, form 12 may be an object that system 10 measures and compares against a desired nominal shape, or the form may have an unknown shape requiring definition by the system.

Estimator 16 and its components include hardware, software, firmware and any other combination of data and signals or executable logic for predicting estimated shape 22 based on position data 18 and normal vector data 20. For example, estimator 16 may include a computer medium, a computer or any other data processing components. Estimator 16 and its components may be, for example, separated into individual modules, may be part of a separate or remote computer system, and may be integrated within measurement device 26. Estimator 16 utilizes the data 18 and 20, or error 30 associated with the data, as an indication of the rate of change of the form at the given point and to develop an estimate of the form between given points. Using the estimated value of the form between points, estimator 16 utilizes adaptive sampling mechanism 28 to iteratively select one or more points where the data associated with the predicted form exceeds predetermined error limits 34 until the estimate converges to the measuring criteria. Further explanation and details will be described below.

Position data 18 and normal vector data 20 respectively may be measured or computed values of position data and normal vector data, as determined by measuring device 26 or other modeling or estimation system corresponding to actual position data 38 and actual normal vector data 40 at a given point. For example, in a perfect measurement system, the value of position data 18 and normal vector data 20 is substantially equal to the value of actual position data 38 and actual normal vector data 40 at a given point.

Estimated shape 22 is a prediction of the shape of form 12 based on position data 18 and normal vector data 20 according to estimation function 24. As such, estimated shape 22 includes predicted or estimated position data 42 and predicted or estimated normal vector data 44, as well as position data 18 and normal vector data 20, or data representative thereof, which may correspond to plurality of points 14. Suitable examples of estimated shape 22 are the same as those mentioned above with regard to form 12, including a surface, a waveform, etc. Further, in a broader sense with particular regard to non-physical phenomenon, estimated shape 22 may include a prediction of the systematic relationship between plurality of points 14.

The values of the data associated with estimated shape 22 will vary depending on the predetermined mathematical model utilized by estimation function 24. Estimation function 24 is a computer medium, program, function or processing device that applies a predetermined mathematical model to the received position data 18 and normal vector data 20, or error data 30 associated therewith, in order to generate estimated shape 22. The predetermined mathematical model includes any model that fits the measured data into a shape. Suitable examples of a predetermined mathematical model includes a polynomial model, a cubic spline model, models using Fourier or fractal or wavelet representations, parametric models such as hermite or bezier or b-spline or cubic spline surfaces, parametric solids, swept solids, controlled deformation solids, graph-based solid models, constructive solid geometry or Boolean models, boundary models, space partitioning models such as oct trees, and general models that preserve adjacency and topology among points in a point set etc.

Measurement device 26 measures the value of position data and measures or estimates normal vector data at a given point on form 12. Measurement device 26 may include, for example, a coordinate measurement machine (CMM), an oscilloscope, an electronic measurement device, a laser measurement device, an optical measurement device, a mechanical measurement device; devices that measure color, sound, motion, position, temperature, velocity, acceleration and other physical characteristics via mechanical, electrical, electronic, optical, hydraulic sensors; devices that measure simulated signals generated via computer simulation or from data stored in a data base, or any other device capable of measuring and/or estimating the value of position and normal vector data.

Adaptive sampling mechanism 28 includes a computer medium, program, function or processing device that automatically develops, in a systematic but variable and input-dependent manner, a sampling plan that identifies sampling points on form 12 and determines whether or not further sampling is required. Adaptive sampling mechanism 28 determines position data error 46 and normal vector data error 48, which define estimation error 30, by comparing estimated shape 22 with reference form 50. Reference form 50 includes reference position data 52 and reference normal vector data 54 corresponding to the plurality of points 14 of form 12. Reference form 50 may be a desired shape of form 12. For example, reference form 50 may include data representative of a desired nominal shape, or a desired nominal shape including acceptable error, such as may be required by manufacturing specifications. Alternatively, reference form 50 may be any shape helpful in determining estimated shape 22. For example, reference form 50 may be a flat, planar shape, thereby having point data and normal vector data with values of zero, that can be used as a comparison with the measured data, such as in al instance when the actual or desired shape of form 12 is unknown.

Adaptive sampling mechanism 28 further includes predetermined error limit 30, which is compared with the estimation error 30 or the measured data to determine whether or not further measurements are required. Predetermined error limit 30 includes predetermined position data error limit 56 and predetermined normal vector data error limit 58, which may correspond to a desired accuracy for estimated shape 22, such as may be required by quality specifications or such as may be dictated by system constraints. Additionally, adaptive sampling mechanism 28 may include predetermined sample spacing limits 60, which may be received or derived from measurement device 26. Predetermined sample spacing limits 60 may be a value representative of a minimum spacing between points that measurement device 26 is capable of sampling, or which an operator may determine is the minimum spacing based on other system constraints such as desired accuracy or sampling time. Predetermined sample spacing limits 60 may further include a maximum desired spacing between samples, such that measurements that exceed the maximum limit drive the system to take further measurements therebetween. Further, adaptive sampling mechanism 28 may include target point 32, which represents the point corresponding to the maximum absolute value of estimation error 30 or estimated data. In other words, target point 32 is the point at which it most desirable or interesting to take an additional measurement in order to accurately estimate the shape of form 12, as target point is the predicted point deviating the most from reference form 50. Adaptive sampling mechanism 28 may decide not to sample target point 32, however, if the absolute value of the error or estimation at the target point is within predetermined error limits 34, or if the position of the target point is within predetermined spacing limits 60 with respect to previously measured points. It should be noted, however, that predetermined error limit 30 is but one example of a predetermined uncertainty criteria that is utilized to determine the sufficiency of the current estimation. Besides physical and error limitations, as discussed above, the predetermined uncertainty criteria may further includes any other criteria useful for determining whether or not to continue measuring and estimating, such as, for example, rule-based criteria and spatial frequency criteria.

Additionally, estimator 16 may include data verification device 36 which includes a computer medium, program, function or processing device that analyzes the validity of measured data 18 and 20 and removes data of questionable validity based on the predicted values associated with estimated shape 22. In other words, data verification device 36 identifies and "throws out" points that are inconsistent with the shape of the form. For example, data verification device 36 may be advantageously utilized when more than a minimum number of measurement data has been gathered to estimate a form, such as in a line scan technique, in order to eliminate inaccurate data from the estimation process. The data of questionable validity, also know as "outlier" data, includes data outside of the limits of the estimated data or estimated data plus error limit for a given point. As an alternative to having outlier data identified as a target point, data verification device 36 removes the outlier data from processing within estimator and thereby removes invalid variability from estimated shape 22. Further, data verification device 36 may be utilized to generate a less complex estimate of the shape or the simplest estimate Such less complex estimates may be useful in reverse engineering applications and computer aided design applications, where simpler forms are desirable as they are more conducive to further computer processing or to fit reduced order models that are conducive to computer-aided engineering methods.

Figure 2:
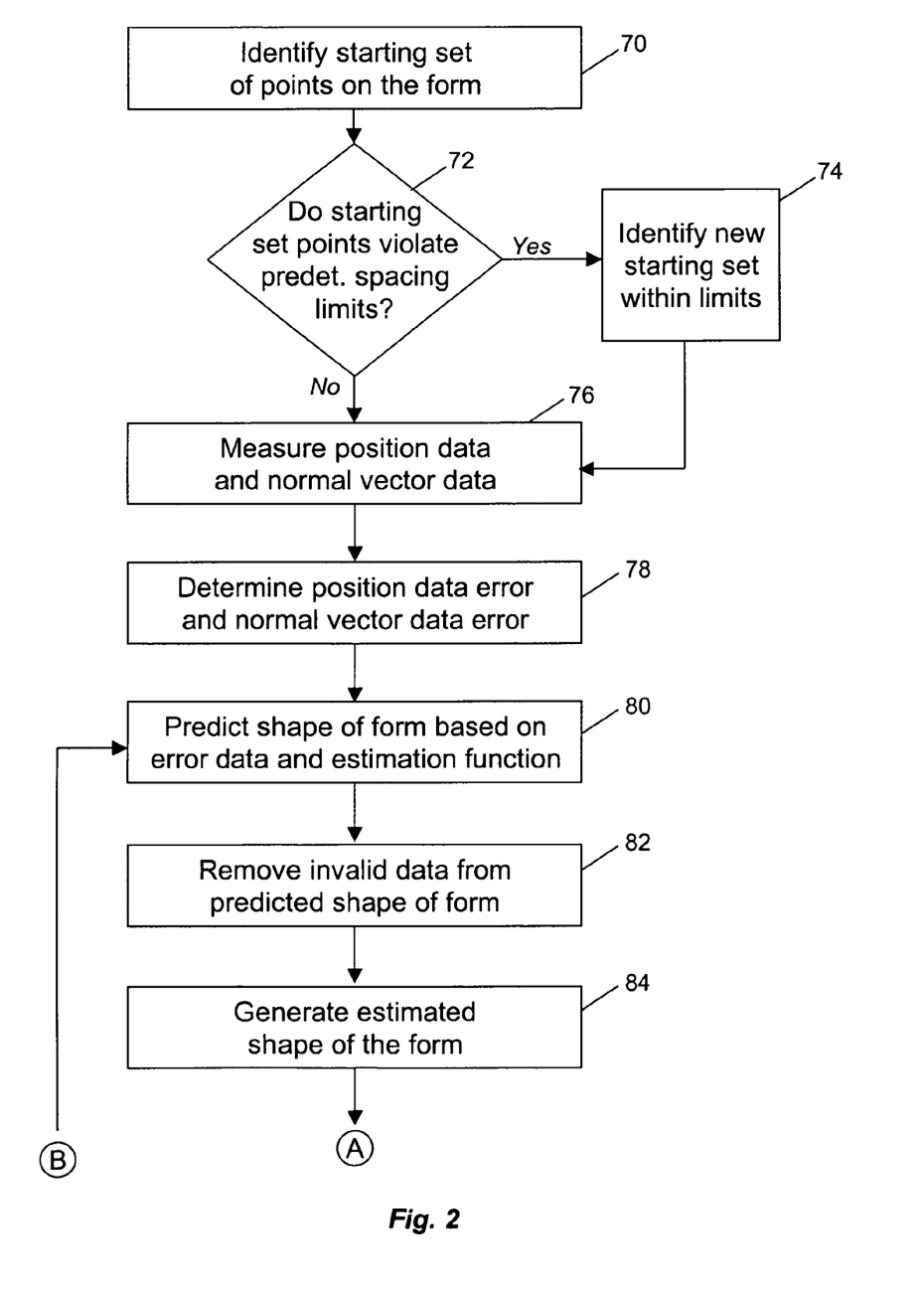
FIGS. 2 and 3 are flowcharts of one embodiment of a method of estimating the shape of a form.

Referring to FIG. 2, one embodiment of a method for estimating the shape of a form having a plurality of points includes identifying a starting set of points on the form for measurement (Block 70). The starting set of points is evaluated to determine whether or not they meet the predetermined sample spacing limits (Block 72). If the starting set does not meet the limits, such as if the points are too closely spaced or spaced too far apart, then a new starting set of points is generated that meet the spacing limits (Block 74). If the starting set does meet the limits, then the next action may be taken (see Block 76, described below). In one embodiment, the starting set of points defines a boundary of the form, and the starting set comprises at least three non-linear points. As such, the form is covered by a "triangular patch" defined by the three points. In one embodiment, one or more triangular patches are identified to cover the portion of the form of interest, where adjacent triangular patches may share all or a portion of a side of a triangular patch. Once one triangular patch is evaluated using the described methodology, the system moves on to the remaining triangular patches until the entire portion of interest of the form has been evaluated. It should be noted that any number of points may be utilized, from a single point to a plurality of points, with the number of points varying depending on the estimation function utilized. Further, it should be noted that rectangular, square, or any other shaped patches may also be utilized. The method works the same for any type of patch—the boundaries could be curves, discrete point sets, or any rule sets that describe which points are on the surface and which are not. Further, surface models that have boundaries outside of the zone formed by the sample points may also be used. Alternatively, the starting set of points may comprise a single line, or two or more lines of spaced-apart points, for example a grid-like array of spaced-apart points, such as may typically be utilized in a line scan type of sampling plan. In one embodiment utilizing such a spaced-apart starting set, the triangular patches are chosen from among the plurality of spaced-apart points such that the three points are not co-linear. In such a manner, a portion of a surface perpendicular to an initial line scan may be evaluated.

Measurements of the values of the position data and the measured or computed normal vector data are then determined for each point of the starting set of points (Block 76). For example, the measuring device 26 (FIG. 1) may translate to each point of the starting set and obtain the desired data. It should be noted, however, that the identification of the starting set and the measurement of the position and normal vector data associated therewith are optional actions, and that the measured position and normal vector data for a given starting set may simply be supplied to the system.

Upon receiving the measured position and measured or computed normal vector data, the method involves determining error data associated with the measured position and measured or computed normal vector data (Block 78). In one embodiment, the error data comprises position data error and normal vector data error determined as the difference between the measured position and normal vector data and reference position and normal vector data. As discussed above, the reference position and normal vector data define a reference form that includes nominal values associated with the form or a zero value in order to determine the shape of the form. In other words, the error data represents the local rate of change of the measured form Alternatively, the measured position and normal vector data may be utilized in place of error data.

Using the error data and an estimation function, the method predicts the shape of the form (Block 80). As described above, the estimation function includes a predetermined mathematical model for deriving estimated values associated with the form based on the data values of the measured points. The measured values associated with the predicted shape are analyzed by data verification device, and invalid data is removed from the prediction (Block 82). This action is applicable, for example, when more than a minimum number of measurement samples have previously been obtained, such as in a line scan. As such, the shape of the form is revised and an estimated shape of the form is generated (Block 84).

Figure 3:
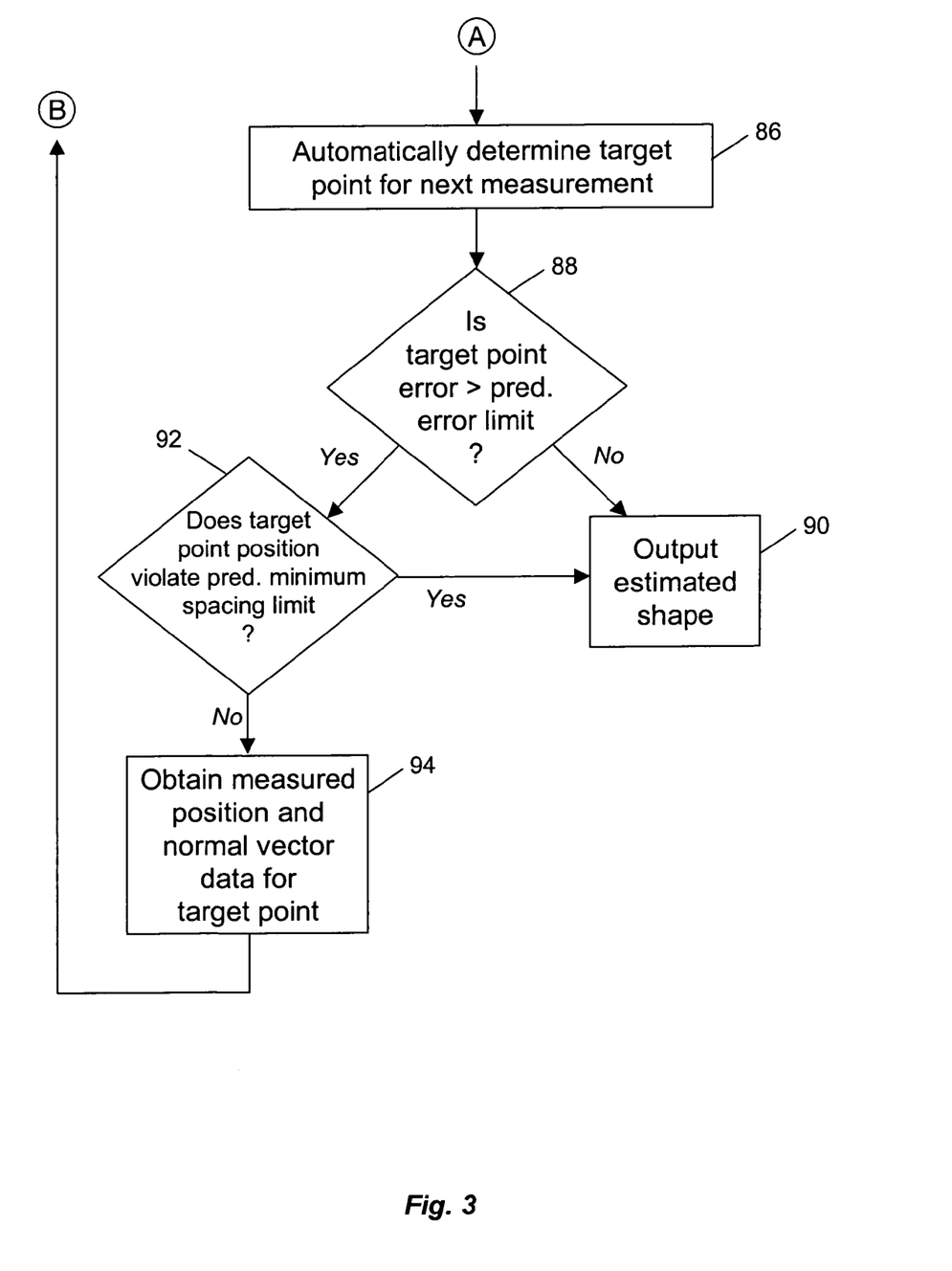

The method then automatically analyzes the data associated with the estimated shape to determine a target point to measure next (Block 86). The target point is the point most likely to contain information relevant to determining the best prediction of the actual shape of the form. In one embodiment, the target point is identified by analyzing the error data associated with the measured and predicted values of the estimated shape, and determining the point having a maximum absolute error value. Then, the estimated error data associated with the target point is compared with the predetermined error limits (Block 88). If the estimated error data associated with the target point is less than or equal to the predetermined error limit, then the estimated shape of the form is output (Block 90). If the estimated error data associated with the target point is greater than the predetermined error limit, then the target point position is evaluated with respect to the predetermined minimum sample spacing limit (Block 92). If the target point position violates the predetermined minimum sample spacing constraint, then no further measurements may be taken and the estimated shape is output (Block 90). If the target point position does not violate the predetermined minimum sample spacing limit, then a measurement of the values of the position and normal vector data at the target point are obtained (Block 94) and the method starting at Block 80 is repeated until the estimated shape is output. As noted above, these actions represent one of many potential embodiments for applying predetermined uncertainty criteria to the estimate to determine a stopping point.

It should be noted that the actions described above with respect to the method for estimating the shape of the form may be performed in an alternate order than described. For example, the screening of the measured and/or estimated data with respect to predetermined limits may occur during any number of, or more than one, of the actions associated with the method.

Thus, the method of estimating a form utilizes position data and normal vector data to automatically sample points on a form according to adaptive sampling techniques, eliminates outlier data, and predicts the shape of the form according to an estimation function such that the estimated shape is accurate within predetermined error limits.

Example embodiments of the present invention have now been described. It will be appreciated that these examples are merely illustrative of the invention. Many variations and modifications of the invention will be apparent to those skilled in the art. For example, system 10 may only include estimator 16, where the estimator may remotely receive and process the measured data to determine estimated shape 22. Thus, the present invention is defined by the following claims and their equivalents.

What is claimed is:

1. A method for estimating a systematic relationship between a plurality of points, comprising:
   receiving a signal comprising coordinate data and normal vector data associated with each point of a starting set of points from a measuring device, where the starting set comprises at least three non-linear points;
   determining by a processor a first estimated relationship between the plurality of points based on the coordinate data and the normal vector data associated with the starting set of points;
   determining by a processor a target point corresponding to a point having a maximum estimated error within the first estimated relationship between the plurality of points; and
   obtaining coordinate data and normal vector data for the target point if the maximum estimated error is greater than a predetermined error limit.

2. The method of claim 1, where the starting set further comprises points defining a boundary of the plurality of points.

3. The method of claim 1, where determining the first estimated relationship between the plurality of points further comprises interpolating between the starting set of points according to a predetermined estimator that incorporates the obtained coordinate data and the obtained normal vector data and generates estimated coordinate data and estimated normal vector data.

4. The method of claim 3, where the predetermined estimator comprises a function for representing a multi-dimensional relationship.

5. The method of claim 3, where the predetermined estimator comprises a cubic spline function.

6. The method of claim 1, where determining the target point further comprises comparing the first estimated relationship between the plurality of points to a reference relationship between the plurality of points to determine a difference defining an error relationship between the plurality of points, where the reference relationship between the plurality of points comprises a plurality of points having reference coordinate data and reference normal vector data, where the error relationship between the plurality of points comprises a plurality of points having coordinate data error and normal vector data error, and where the maximum estimated error corresponds to the maximum absolute value of the coordinate data error or the normal vector data error.

7. The method of claim 6, where the reference relationship between the plurality of points comprises a plurality of points having predetermined values.

8. The method of claim 7, where the predetermined values define the relationship between the plurality of points according to predetermined standards.

9. The method of claim 7, where the predetermined values are zero.

10. The method of claim 1, where the predetermined error limit corresponds to a predetermined level of accuracy.

11. The method of claim 1, further comprising:
    obtaining coordinate data and normal vector data for each point of a second set of points if the maximum estimated error is greater than the predetermined error limit; and
    determining a second estimated relationship between the plurality of points representative of a subset of the plurality of points based on the second set of coordinate data and the second set of normal vector data.

12. The method of claim 11, where the second set comprises at least the target point and two of the three points of the starting set.

13. The method of claim 11, further comprising:
    determining a new target point corresponding to a new maximum estimated error within the second estimated relationship between the plurality of points; and
    obtaining coordinate data and normal vector data for the new target point if the new maximum estimated error is greater than the predetermined error limit.

14. The method of claim 1, further comprising removing data associated with the first estimated relationship between the plurality of points based on the normal vector data.

15. The method of claim 1, wherein the measuring device comprises a coordinate measurement machine (CMM).

16. The method of claim 1, wherein the measuring device comprises an oscilloscope.

17. The method of claim 1, wherein the measuring device comprises a laser measurement device.

18. The method of claim 1, wherein the measuring device comprises an optical measurement device.

19. A method for estimating a relationship between a plurality of points, comprising:
generating by a processor a first estimated relationship between the plurality of points based on measured coordinate data and normal vector data received from a measuring device, the measured coordinate data comprising a measured value of a vector associated with a point corresponding to a given one of the plurality of points, the normal vector data representative of a local rate of change with respect to the vector associated with the given one of the plurality of points, the first estimated relationship between the plurality of points derived from estimated normal vector data corresponding to at least a portion of the plurality of points; and
automatically determining by a processor whether further measurements are required based on the estimated normal vector data in combination with predetermined measurement criteria comprising error limitations.

20. The method of claim 19, where generating the first estimated relationship between the plurality of points further comprises:
generating coordinate data error and normal vector data error respectively corresponding to the measured coordinate data and the normal vector data; and
generating the first estimated relationship between the plurality of points according to a predetermined estimation function and based on the coordinate data error and the normal vector data error.

21. The method of claim 19, where the predetermined measurement criteria comprise criteria selected from the group consisting of physical limitations and rule-based criteria.

22. A method of estimating a relationship between a plurality of points, comprising:
removing data from a plurality of coordinate data and normal vector data associated with measured points received from a measuring device, the measured points defining a starting set associated with the plurality of points based on estimated normal vector data associated with the measured points, thereby defining a revised starting set, wherein the data is removed based on error limitations; and
determining by a processor a first estimated relationship between the plurality of points based on the coordinate data and the normal vector data of the revised starting set, the coordinate data comprising a measured value of a vector associated with a point corresponding to a given one of the plurality of points, the normal vector data comprising a local rate of change associated with the vector of the given one of the plurality of points, the first estimated relationship between the plurality of points derived from estimated normal vector data corresponding to at least a portion of the plurality of points.

23. A computer readable medium for estimating a systematic relationship between a plurality of points, comprising:
an estimation module having a predetermined estimation function operative to generate a first estimated systematic relationship between the plurality of points based on coordinate data and normal vector data, the coordinate data comprising a measured value of a vector corresponding to a given one of the plurality of points, the first estimated systematic relationship between the plurality of points derived from estimated normal vector data corresponding to at least a portion of the plurality of points; and
an adaptive sampling module operative to automatically determine whether further measurements are required based on the estimated normal vector data in combination with predetermined measurement criteria comprising error limitations.

24. The computer-readable medium of claim 23, where the predetermined estimation function comprises a function for representing a multi-dimensional relationship.

25. The computer-readable medium of claim 23, where the predetermined measurement criteria comprise criteria selected from the group consisting of physical limitations and rule-based criteria.

26. A system for estimating a systematic relationship between a plurality of points, comprising:
an estimator having an estimation function operable for determining a first estimated systematic relationship between the plurality of points, the first estimated systematic relationship between the plurality of points having coordinate data and normal vector data determined from a starting set of measured points associated with the plurality of points;
wherein the coordinate data comprise a value of a vector associated with the plurality of points;
wherein the normal vector data comprise a value of a local rate of change of the vector associated with the plurality of points; and
wherein the estimator further comprises reference coordinate data and reference normal vector data respectively corresponding to a reference systematic relationship between the plurality of points, the reference systematic relationship between the plurality of points representing a known systematic relationship between the plurality of points, the estimator further comprising coordinate data error and normal vector data error, the coordinate data error representing a difference between the coordinate data and the reference coordinate data and the normal vector data error representing a difference between the normal vector data and the reference normal vector data, wherein the first estimated systematic relationship between the plurality of points is determined based on the coordinate data error and normal vector data error.

27. The system of claim 26, further comprising an adaptive sampling mechanism having predetermined measurement criteria, wherein the adaptive sampling mechanism is operative to generate a measurement decision based on an evaluation of the coordinate data and the normal vector data with respect to the predetermined measurement criteria.

28. The system of claim 27, where the estimation function comprises a cubic spline function.

29. The system of claim 26, wherein the predetermined measurement criteria comprise criteria selected from the group consisting of physical limitations, error limitations, and rule-based criteria.

30. The system of claim 26, wherein the estimation function comprises a function for representing a multi-dimensional relationship.

31. A system for estimating a systematic relationship between a plurality of points, comprising:
an estimator comprising a first program operable for receiving coordinate data and normal vector data associated with each of a starting set associated with the plurality of points, wherein the starting set comprises at least three non-linear points, the estimator further comprising a first estimated systematic relationship between the plurality of points and a predetermined estimation function, the first estimated systematic relationship between the plurality of points comprising estimated coordinate data and estimated normal vector data representative of an estimate of the systematic relationship between the plurality of points and generated by the predetermined estimation function based on the coordinate data and the normal vector data; and an adaptive sampling mechanism operative on a systematic relationship error representative of a difference between the first estimated systematic relationship and a reference systematic relationship, wherein the reference systematic relationship comprises reference coordinate data and reference normal vector data each having desired values associated with the plurality of points, wherein the systematic relationship error comprises a plurality of points corresponding to the reference systematic relationship and having coordinate data error and normal vector data error, the adaptive sampling mechanism further operative to generate a target point and further comprising a predetermined error limit, the target point corresponding to a point having a maximum estimated error within the systematic relationship error and the predetermined error limit comprising a value determinative of an acceptability of the systematic relationship error.

\* \* \* \* \*

UNITED STATES PATENT AND TRADEMARK OFFICE
CERTIFICATE OF CORRECTION

PATENT NO. : 7,787,696 B2  Page 1 of 1
APPLICATION NO. : 09/876915
DATED : August 31, 2010
INVENTOR(S) : Robert G. Wilhelm et al.

It is certified that error appears in the above-identified patent and that said Letters Patent is hereby corrected as shown below:

Column 4, line 52, After "system 10 for estimating", please delete "a.", and insert -- a --.

Column 6, line 61, After "data, such as in", please delete "al", and insert -- an --.

Column 7, line 49, Please delete "know", and insert -- known --.

Column 7, line 57, After "shape or the simplest", please delete "estimate", and insert -- estimate. --.

Column 8, line 57, After "change of the measured", please delete "form", and insert -- form. --.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,787,696 B2 | Page 1 of 1 |
| APPLICATION NO. | : 09/876915 | |
| DATED | : August 31, 2010 | |
| INVENTOR(S) | : Wilhelm et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2542 days.

Signed and Sealed this
Fifteenth Day of February, 2011

David J. Kappos
*Director of the United States Patent and Trademark Office*